United States Patent
Brower (10) Patent No.: US 12,126,160 B2
(45) Date of Patent: Oct. 22, 2024

(54) ARC FAULT DETECTION AND PROTECTION IN A DIGITAL ELECTRICITY POWER DISTRIBUTION SYSTEM

(71) Applicant: Hubbell Incorporated, Shelton, CT (US)

(72) Inventor: John Brower, Fairfield, CT (US)

(73) Assignee: Hubbell Incorporated, Shelton, CT (US)

( * ) Notice: Subject to any disclaimer, the term of this patent is extended or adjusted under 35 U.S.C. 154(b) by 217 days.

(21) Appl. No.: 17/774,709

(22) PCT Filed: Nov. 6, 2020

(86) PCT No.: PCT/US2020/059369
§ 371 (c)(1),
(2) Date: May 5, 2022

(87) PCT Pub. No.: WO2021/092350
PCT Pub. Date: May 14, 2021

(65) Prior Publication Data
US 2022/0393455 A1    Dec. 8, 2022

Related U.S. Application Data

(60) Provisional application No. 62/931,408, filed on Nov. 6, 2019.

(51) Int. Cl.
*H02H 1/00* (2006.01)
*H04B 3/46* (2015.01)
*H04B 3/54* (2006.01)

(52) U.S. Cl.
CPC ............. *H02H 1/0015* (2013.01); *H04B 3/46* (2013.01); *H04B 3/54* (2013.01)

(58) Field of Classification Search
CPC ...... H02H 1/0015; H02H 1/0061; H04B 3/46; H04B 3/54; H04L 12/10
See application file for complete search history.

(56) References Cited

U.S. PATENT DOCUMENTS

| 3,996,496 A | 12/1976 | Haun et al. |
| 6,456,471 B1 | 9/2002 | Haun et al. |

(Continued)

FOREIGN PATENT DOCUMENTS

WO    2021/092350 A1    5/2021

OTHER PUBLICATIONS

European Search Report dated Aug. 21, 2023 for corresponding European Application No. 20885704.5.
(Continued)

*Primary Examiner* — Akm Zakaria
(74) *Attorney, Agent, or Firm* — Michael Best & Friedrich LLP (57) ABSTRACT

Arc fault protection for a digital electricity distribution system that provides power to a device. The system includes an arc fault circuit interrupter ("AFCI") and a controller. The controller is connected to the AFCI. The controller is operable to control the AFCI to disable power to the device. The controller includes a processor and a memory. The controller is configured to transmit a digital electricity energy packet through the AFCI to the device, measure an amount of error associated with the digital electricity energy packet, evaluate the amount of error associated with the digital electricity energy packet, determine whether an arc fault condition is present based on the evaluation of the amount of error associated with the digital electricity energy packet, and control the AFCI to disable power to the device when the arc fault condition is determined to be present.

20 Claims, 5 Drawing Sheets

(56) References Cited

U.S. PATENT DOCUMENTS

| | | | |
|---|---|---|---|
| 7,345,489 B2* | 3/2008 | DeHaven | H02H 1/0015 |
| | | | 324/555 |
| 2002/0063565 A1 | 5/2002 | Stroth | |
| 2013/0128396 A1* | 5/2013 | Danesh | G01R 23/02 |
| | | | 361/45 |
| 2013/0234535 A1* | 9/2013 | Sako | H01H 47/002 |
| | | | 307/126 |
| 2014/0084942 A1 | 3/2014 | Logvinov et al. | |
| 2015/0100856 A1* | 4/2015 | Zhang | H03M 13/09 |
| | | | 714/776 |
| 2015/0215001 A1 | 7/2015 | Eaves | |
| 2020/0028349 A1* | 1/2020 | Elliott | G01R 15/16 |
| 2021/0288521 A1* | 9/2021 | Sloop | H02J 3/0012 |

OTHER PUBLICATIONS

International Search Report and Written Opinion mailed in Application No. PCT/US2020/059369, dated Feb. 4, 2021.

* cited by examiner

ARC FAULT DETECTION AND PROTECTION IN A DIGITAL ELECTRICITY POWER DISTRIBUTION SYSTEM

RELATED APPLICATIONS

This application claims the benefit of U.S. Provisional Patent Application No. 62/931,408, filed Nov. 6, 2019, the entire content of which is hereby incorporated by reference.

FIELD

Embodiments described herein relate to safety protection devices and methods for a power distribution system.

SUMMARY

Digital electricity is a power format where electrical power is distributed in discrete, controllable units of energy or packets. Unlike traditional analog power systems, individual packets of energy can be associated with data or digital information that can be used to control the operation of a device receiving the power of a power system itself. As a result of the differences between conventional, analog power and digital electricity, conventional fault detection techniques either cannot be used with digital electricity or cannot be used effectively (e.g., safely) with digital electricity.

An arc fault is a high power discharge of electricity between two or more conductors. Arc faults can produce currents from a few Amps up to thousands of Amps and can vary in both strength and duration. An arc fault occurs when, for example, loose or corroded wiring connections create an intermittent contact that causes electrical current to spark or arc between contact points. The arcing generates heat. The generated heat can break down, for example, the insulation surrounding individual conducting wires, which can lead to an electrical fire. An arc fault protection device (e.g., an arc fault circuit interrupter ["AFCI"]) is any device that is designed to guard against arc faults. Conventional arc fault protection devices monitor alternating currents for an unwanted arcing condition (e.g., based on magnitude and/or frequency). However, such conventional arc fault protections are ineffective for digital electricity systems in which power is transmitted in discrete energy packets.

Embodiments described herein provide arc fault protection for a digital electricity distribution system for providing power to a device. The system includes an arc fault circuit interrupter ("AFCI") and a controller. The controller is connected to the AFCI. The controller is operable to control the AFCI to disable power to the device. The controller includes a processor and a memory. The controller is configured to transmit a digital electricity energy packet through the AFCI to the device, measure an amount of error associated with the digital electricity energy packet, evaluate the amount of error associated with the digital electricity energy packet, determine whether an arc fault condition is present based on the evaluation of the amount of error associated with the digital electricity energy packet, and control the AFCI to disable power to the device when the arc fault condition is determined to be present.

In some aspects, the digital electricity energy packet includes an energy payload and a data payload.

In some aspects, the amount of error is associated with one selected from the group consisting of: a loss of data in the data payload; an amount of attenuation of the data payload; and an amount of distortion associated with the data payload.

In some aspects, the power provided to the device is between 400 W and 600 W.

In some aspects, the controller is further configured to determine whether one of a cross-line fault condition, an in-line fault condition, a ground fault condition, or a neutral fault condition is present.

In some aspects, the amount of error associated with the digital electricity energy packet is an aggregate of errors from unreceived data in a series of energy packets.

In some aspects, the amount of error associated with the digital electricity energy packet is an aggregate of errors from unreceived data over a predetermined period of time.

In some aspects, the controller is further configured to determine whether the arc fault condition is present based on a comparison of the amount of error to at least one of a frame loss rate threshold value, an attenuation threshold value, a signal-to-noise ratio threshold value.

In some aspects, the arc fault condition is caused by at least one of an improper connection, a loose connection, excessive cable length, or external noise.

In some aspects, the controller is further configured to determine whether the arc fault condition is present based on the evaluation of the amount of error based on a comparison to a predetermined data packet.

In some aspects, the controller is further configured to determine whether the arc fault condition is present based on a percentage correlation of the digital electricity energy packet and the predetermined data packet.

Embodiments described herein provide a power distribution system for providing power to a device. The system includes a power transmitter, a power receiver, an arc fault circuit interrupter ("AFCI"), and a controller. The power transmitter is configured to receive at least one of an alternative current ("AC") input power and a direct current ("DC") input power and generate digital electricity energy packets for distribution through the system. The power receiver is electrically connected to the power transmitter for receiving the digital electricity energy. The AFCI is connected between the power transmitter and the power receiver. The controller is connected to the AFCI. The controller is operable to control the AFCI to disable power from the power transmitter to the power receiver. The controller includes a processor and a memory. The controller is configured to transmit a digital electricity energy packet through the AFCI to the power receiver, measure an amount of error associated with the digital electricity energy packet, evaluate the amount of error associated with the digital electricity energy packet, determine whether an arc fault condition is present based on an evaluation of the amount of error associated with the digital electricity energy packet, and control the AFCI to disable power to the power receiver when the arc fault condition is determined to be present.

In some aspects, the digital electricity energy packet includes an energy payload and a data payload.

In some aspects, the amount of error is associated with one selected from the group consisting of: a loss of data in the data payload; an amount of attenuation of the data payload; and an amount of distortion associated with the data payload.

Embodiments described herein provide a method for disabling power to a device in a digital electricity system. The digital electricity system includes an arc fault circuit interrupter ("AFCI"). The method includes transmitting a digital electricity energy packet through the AFCI to the device, measuring an amount of error associated with the digital electricity energy packet, evaluating the amount of error associated with the digital electricity energy packet, determining whether an arc fault condition is present based on an evaluation of the amount of error associated with the digital electricity energy packet, and controlling the AFCI to disable power to the device when the arc fault condition is determined to be present.

In some aspects, the digital electricity energy packet includes an energy payload and a data payload.

In some aspects, the amount of error is associated with a loss of data in the data payload.

In some aspects, the amount of error is associated with an amount of attenuation of the data payload.

In some aspects, the amount of error is associated with an amount of distortion associated with the data payload.

In some aspects, the power provided to the device is between 400 W and 600 W.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1:
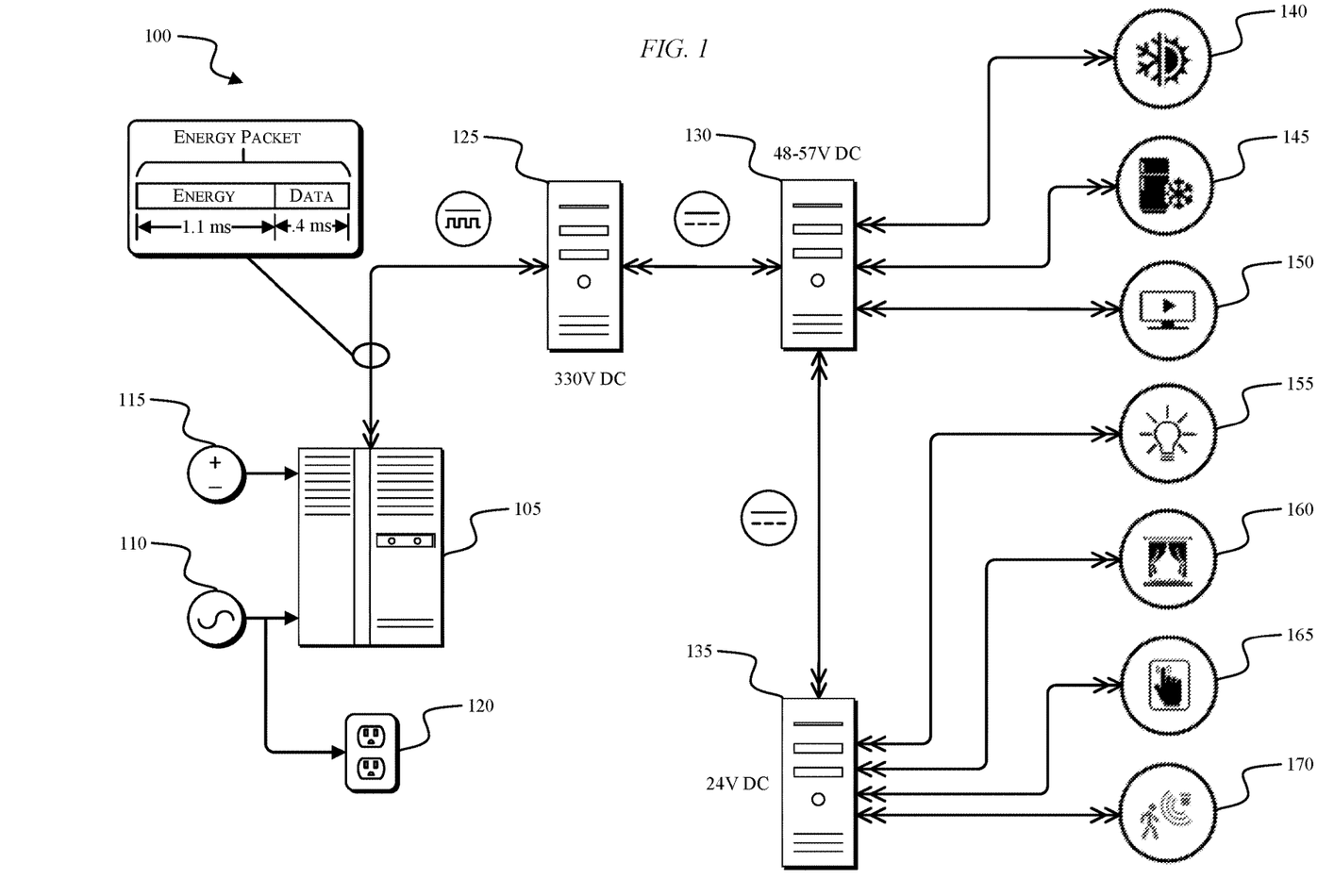
FIG. 1 illustrates a digital electricity power distribution system, according to embodiments described herein.

FIG. 1 illustrates a system 100 that includes a digital electricity transmitter or server 105. The transmitter 105 is coupled to a source of alternating current ("AC") power 110 (e.g., AC mains power) and one or more sources of direct current ("DC") power 115 (e.g., a photovoltaic array, a battery bank, etc.). In some embodiments, the source of AC power 110 bypasses the transmitter 105 and provides power to a conventional wall outlet 120. The transmitter 105 is configured to convert the input AC or DC power into digital electricity. Digital electricity can be represented as one or more energy packets that include both energy and data. The digital electricity energy packets are transmitted from the transmitter 105 to a receiver 125. FIG. 1 illustrates an energy packet for exemplary purposes including a 1.1 millisecond energy payload and a 0.4 millisecond data payload.

The digital electricity is received by the receiver 125. In some embodiments, the received digital electricity is received by the receiver 125 at a voltage of 330V DC. The transmitter 105 and the receiver 125 are capable of one-way communication (e.g., transmitter 105 to receiver 125) or two-way communication. The receiver 125 is configured to receive the digital electricity and determine, for example, if the data portion of an energy packet was received. If the data portion of the energy packet is not received, a fault may have occurred during the transmission of the digital electricity from the transmitter 105 to the receiver 125. The receiver 125 is also configured to convert the received digital electricity to conventional DC power for further transmission to a first power distribution controller 130. In some embodiments, the receiver 125 is configured to transmit digital electricity to the first power distribution controller 130 in a similar manner to the transmitter 105 transmitting digital electricity to the receiver 125. In some embodiments, the first power distribution controller 130 is a Cisco 8U Catalyst Digital Building Series Switch.

The first power distribution controller 130 is configured to receive power at a lower voltage than the power received by the receiver 125. For example, the receiver 125 includes a DC-to-DC converter that steps down the received voltage to a lower level. Alternatively, the first power distribution controller 130 is configured to receive power at the same voltage as the receiver 125. In such embodiments, the first power distribution controller 130 can include a DC-to-DC converter that steps down the received voltage to a lower level. In the illustrated embodiment, the first power distribution controller 130 outputs voltages of between 48V DC and 57V DC. In other embodiments different voltage ranges can be produced (e.g., between 5V DC and 60V DC).

The first power distribution controller 130 is also configured to relay DC power for further transmission to a second power distribution controller 135. In some embodiments, the first power distribution controller 130 is configured to transmit digital electricity to the second power distribution controller 135 in a similar manner to the transmitter 105 transmitting digital electricity to the receiver 125. The second power distribution controller 135 is configured to receive power at a lower voltage than the power received by the first power distribution controller 130. For example, the first power distribution controller 130 includes a DC-to-DC converter that steps down the received voltage to a lower level. Alternatively, the second power distribution controller 135 is configured to receive power at the same voltage as the first power distribution controller 130. In such embodiments, the second power distribution controller 135 can include a DC-to-DC converter that steps down the received voltage to a lower level. In the illustrated embodiment, the second power distribution controller 135 outputs voltages of, for example, 24V DC. In other embodiments different voltages can be produced (e.g., between 5V DC and 60V DC). In some embodiments, the second power distribution controller 135 is a nuLEDs SPICEbox.

The first power distribution controller 130 and the second power distribution controller 135 are each configured to be electrically and/or communicatively connected to one or more powered devices. In the illustrated embodiment, the first power distribution controller 130 is connected to a heating ventilation and air conditioning ("HVAC") unit 140, a refrigerator 145, and an entertainment system 150. In some embodiments, the connections between the first power distribution controller and the devices 140, 145, and 150 are made using Cat 5-Cat 8 Ethernet cables. In some embodiments, both electricity and data are provided over the Ethernet cables in a power-over-Ethernet ("POE") implementation. In a POE implementation, one or two way communications can be achieved between the first power distribution controller 130 and the devices 140, 145, and 150.

In the illustrated embodiment, the second power distribution controller 135 is connected to lights 155, curtains/shades 160, input controls 165, and sensors 170. In some embodiments, the connections between the second power distribution controller 135 and the devices 155, 160, 165, and 170 are made using CAT 5-CAT 8 Ethernet cables. In some embodiments, both electricity and data are provided over the Ethernet cables in a POE implementation. In a POE implementation, one or two way communications can be achieved between the second power distribution controller 135 and the devices 155, 160, 165, and 170.

Figure 2:
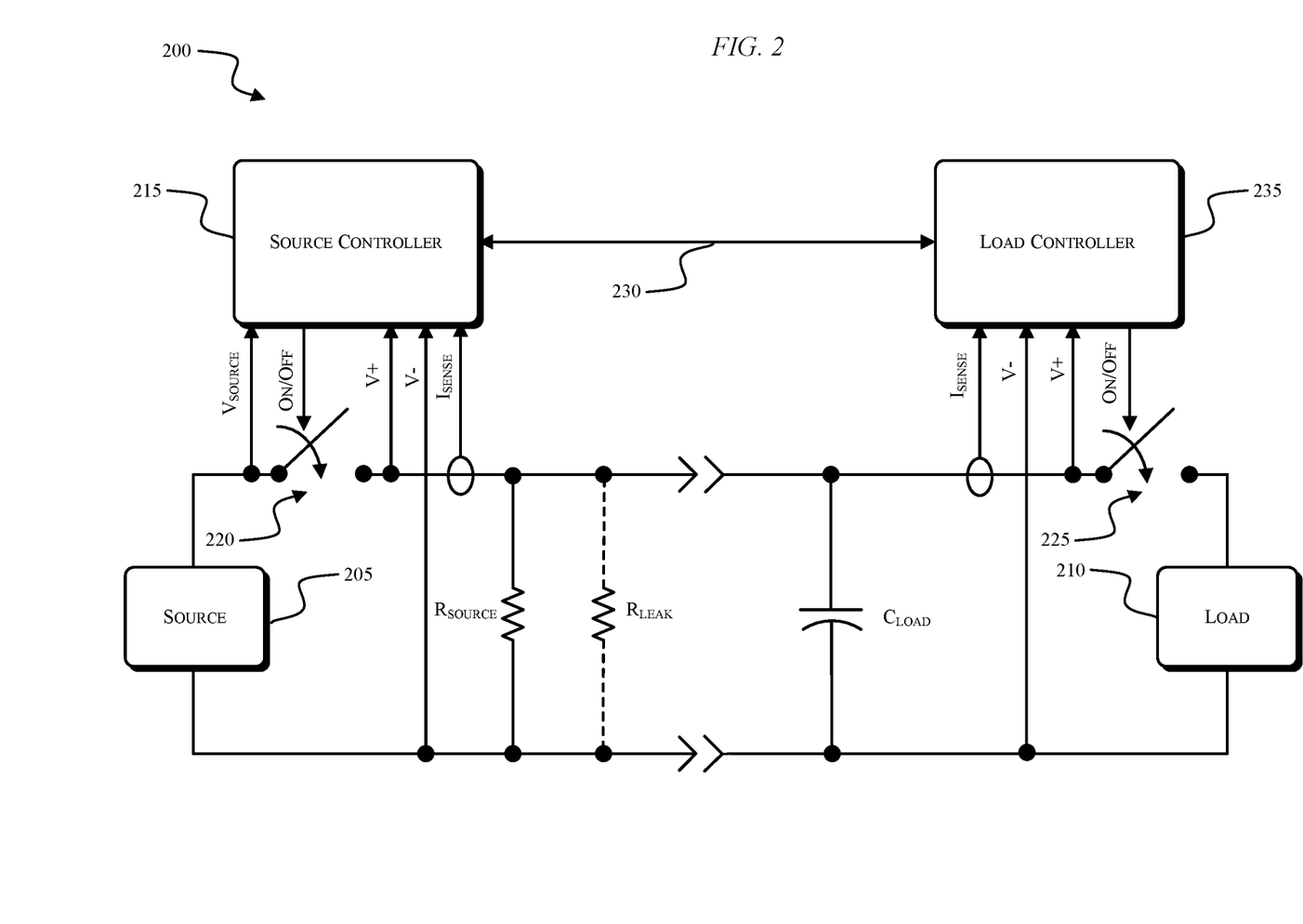
FIG. 2 is a simplified schematic diagram of a digital electricity power distribution system, according to embodiments described herein.

A simplified schematic diagram of a digital electricity distribution system 200, such as the system 100 in FIG. 1, is illustrated in FIG. 2. The distribution system 200 is configured to regulate the transfer of energy from a source 205 to a load 210. A source controller 215 is configured to periodically open a switch 220 for a predetermined period of time (e.g., a sample period). In some embodiments, the switch 220 is a solid state switch (e.g., a FET). A load capacitor, CLOAD, is electrically connected to the terminals of the load 210. The load capacitor, CLOAD, stores energy from the terminals of the load 210 prior to the switch 220 being opened. A source resistance, RsouRcE, is electrically connected between the terminals of the source 205.

During normal operation, when the switch 220 is opened, the voltage across the load capacitor, CLOAD, decays as it discharges through the source resistance, RSOURCE, and into the load 210. A switch 225 is configured to isolate the load capacitor, CLOAD, from the load 210. In some embodiments, the switch 225 is a solid state switch (e.g., a FET). When the switch 225 is opened, the only discharge path for the load capacitor, CLOAD, should be through the source resistance, RSOURCE. However, during, for example, a cross-line fault, resistance from a foreign object (e.g., a person) is introduced into the system 200 as a leak resistance, RLEAK. The parallel combination of the source resistance, RSOURCE, and leak resistance, RLEAK, significantly increases the rate of voltage decay from the load capacitor, CLOAD.

The voltage across the load capacitor, CLOAD, prior to the switch 220 being opened is measured by the source controller 215. At the end of the sample period and prior to the switch 220 being closed, the source controller 215 measures the voltage across the load capacitor, CLOAD, again. The source controller 215 compares the voltage across the load capacitor, CLOAD, at the two different times to determine if a fault has occurred. If the voltage across the load capacitor, CLOAD, has decayed too quickly (or too slowly), a fault can be registered and the switch 220 remains opened. A high rate of voltage decay for the load capacitor, CLoAD, indicates a cross-line fault. A low rate of voltage decay for the load capacitor, CLOAD, indicates an in-line fault. If there is no fault condition detected, the switch 220 and switch 225 can be closed. Energy is then transferred between the source 205 and the load 210 until the next sample period. In some embodiments, the conducting period between sampling periods is referred to as an energy transfer period.

In some embodiments, a communication link 230 can be provided between the source controller 215 and a load controller 235. In such embodiments, the source controller 215 can receive the load terminal voltage from the load controller 235. In some embodiments, a digital verification code can be exchanged between the source controller 215 and the load controller 235 before energy is transferred between the source 205 and the load 210. The power distribution technique described with respect to FIG. 2 can be applied between any two adjacent power distribution components in the system 100 of FIG. 1. For example, the source could be the transmitter 105 and the load could be the receiver 125, the source could be the receiver 125 and the load could be the first power distribution controller 130, the source could be the first power distribution controller 130 and the load could be the second power distribution controller 135. In some embodiments, the source is one of the first power distribution controller 130 or second power distribution controller 135 and the load is one of the devices 140-170.

Figure 3:
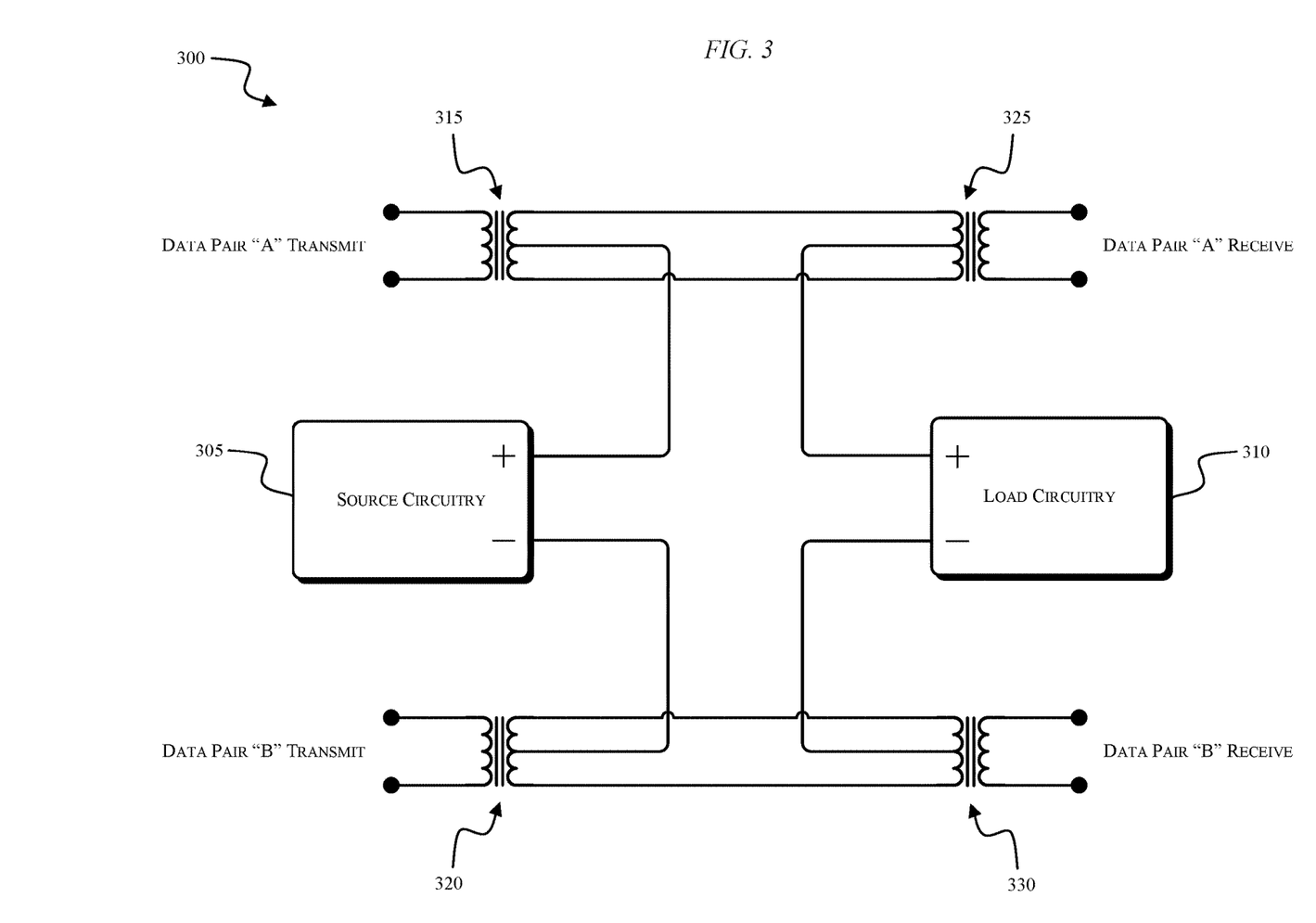
FIG. 3 illustrates a center-tapped isolation transformer for combining data and power on twisted pair cabling, according to embodiments described herein.

As described above, the first power distribution controller 130 and the second power distribution controller 135 can be configured in a POE implementation to provide both power and data to the devices 140-170. FIG. 3 illustrates a system 300 for achieving POE between the first power distribution controller 130 or the second power distribution controller 135 and the devices 140-170. Specifically, FIG. 3 illustrates a center-tapped isolation transformer for combining data and power on twisted pair cabling. In other embodiments, different techniques for achieving POE can be used.

In some embodiments, a CAT 5-CAT 8 Ethernet cable is used to transfer Ethernet data between the first power distribution controller 130 or the second power distribution controller 135 and the devices 140-170. That Ethernet cable can also be used to provide, for example, between 400W and 600W of power to the devices 140-170. Output conductors of source circuitry 305 are applied to center tap points on isolation transformers 315, 320 on the source side of the system 300. Output conductors of load circuitry 310 are applied to center tap points on the isolation transformers 325, 330. On the source side, Ethernet data can be applied to the windings of the transformers 315, 320. On the load side, the signals corresponding to the Ethernet data are picked up by the transformers 325, 330. Because the power being transmitted is DC, the signals corresponding to the Ethernet data do not cause excitation in the transformers 315, 320. As a result, the Ethernet data is not corrupted during transfer.

Figure 4:
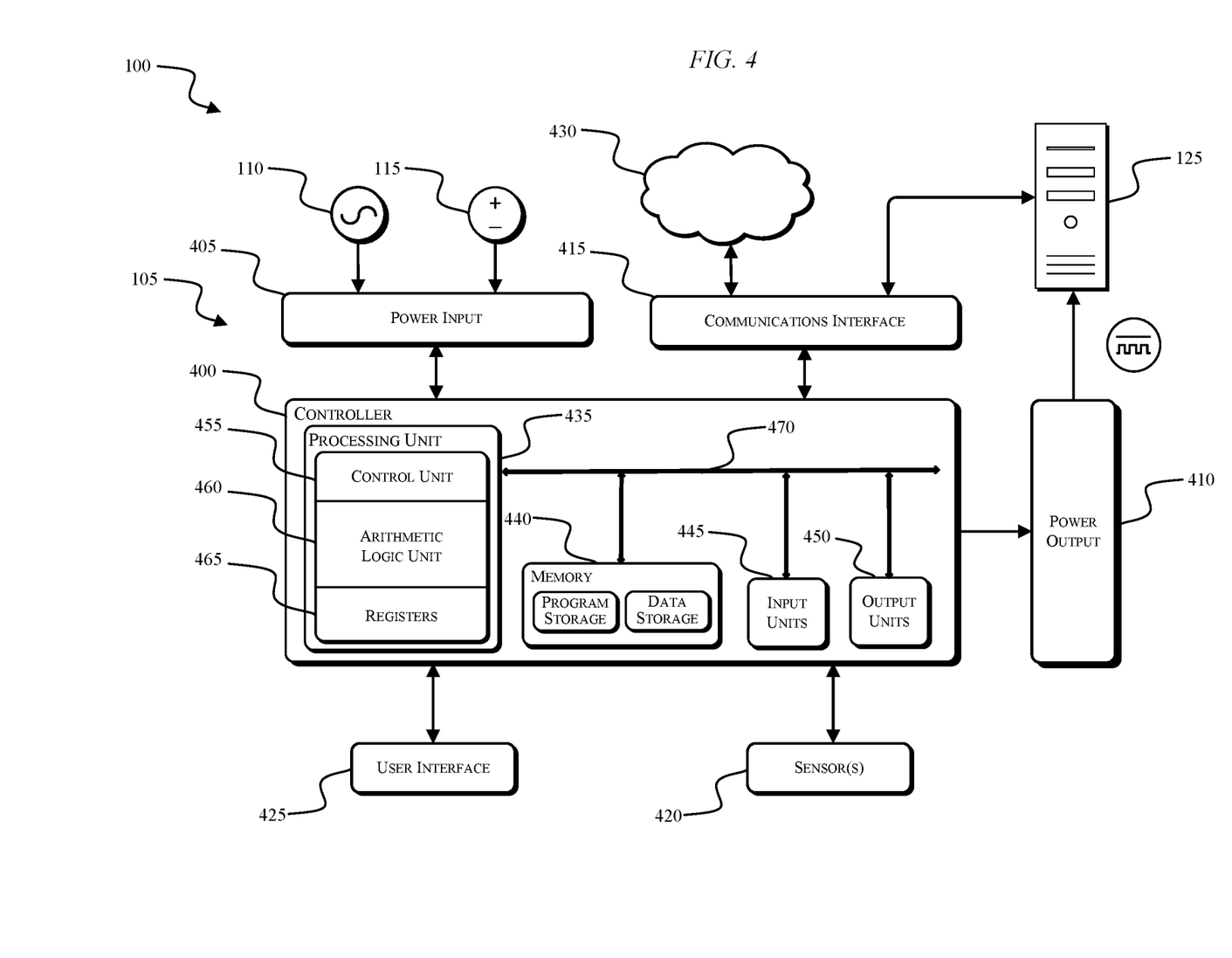
FIG. 4 illustrates a digital electricity transmitter, according to embodiments described herein.

FIG. 4 illustrates the transmitter 105 of FIG. 1 in more detail. The transmitter 105 is electrically and/or communicatively connected to a variety of modules or components of the system 100. For example, the transmitter 105 is connected to the source of AC power 110, the one or more sources of DC power 115, and the receiver 125. The transmitter 105 includes a controller 400, a power input module 405, a power output module 410, a communications interface 415, one or more sensors 420, and a user interface 425. The controller 400 includes combinations of hardware and software that are operable to, for example, generate digital electricity, monitor for transmission fault conditions, etc. The controller 400 includes a plurality of electrical and electronic components that provide power and operational control to the components and modules within the controller 400 and/or the system 100. For example, the controller 400 includes, among other things, a processing unit 435 (e.g., a microprocessor, a microcontroller, or another suitable programmable device), a memory 440, input units 445, and output units 450. The processing unit 435 includes, among other things, a control unit 455, an arithmetic logic unit ("ALU") 460, and a plurality of registers 465 (shown is a group of registers in FIG. 4) and is implemented using a known architecture. The processing unit 435, the memory 440, the input units 445, and the output units 450, as well as the various modules connected to the controller 400 are connected by one or more control and/or data buses (e.g., common bus 470). The control and/or data buses are shown schematically in FIG. 4 for illustrative purposes.

The memory 440 is a non-transitory computer readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The processing unit 435 is connected to the memory 440 and executes software instructions that are capable of being stored in a RAM of the memory 440 (e.g., during execution), a ROM of the memory 440 (e.g., on a generally permanent basis), or another non-transitory computer readable data storage medium such as another memory or a disc. Software included in the implementation of the system 100 or controller 400 can be stored in the memory 440 of the controller 400. The software includes, for example, firmware, one or more applications, program data, filters, rules, one or more program modules, and other executable instructions. The controller 400 is configured to retrieve from memory and execute, among other things, instructions related to the control methods and processes describe herein. In some embodiments, the controller 400 includes a plurality of processing units 435 and/or a plurality of memories 440 for retrieving from memory and executing the instructions related to the control methods and processes describe herein.

In some embodiments, the controller 400 or network communications interface 415 includes one or more communications ports (e.g., Ethernet, serial advanced technology attachment ["SATA"], universal serial bus ["USB"], integrated drive electronics ["IDE"], etc.) for transferring, receiving, or storing data associated with the transmitter 105 or the operation of the transmitter 105. In some embodiments, the communications interface 415 enables communication with an external network 430 for control and/or monitoring related to the system 100. The network 430 is, for example, a wide area network ("WAN") (e.g., a TCP/IP based network), a local area network ("LAN"), a neighborhood area network ("NAN"), a home area network ("HAN"), or personal area network ("PAN") employing any of a variety of communications protocols, such as Wi-Fi, Bluetooth, ZigBee, etc. In some embodiments, the network 430 is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, a 5G New Radio network, a Digital Enhanced Cordless Telecommunications ("DECT") network, a Digital AMPS ("IS-136/TDMA") network, or an Integrated Digital Enhanced Network ("iDEN") network, etc.

The sensors 420 can include voltage sensors, current sensors, temperature sensors, etc. Output signals from the sensors 420 can be used by the controller 400 to determine various fault conditions of the transmitter 105 or the system 100. In some embodiments, the fault conditions include cross-line fault conditions, in-line fault conditions, ground fault conditions, arc fault conditions, neutral fault conditions, etc.

The user interface 425 can include a combination of digital and analog input or output devices required to achieve a desired level of control and monitoring for the transmitter 105. For example, the user interface 425 can include a display, one or more LEDs, and/or input devices such as a mouse, touch-screen display, a plurality of knobs, dials, switches, buttons, etc.

The power input module 405 is configured to receive input power from the source of AC power 110 and/or the source of DC power 115. The power input module 405 is configured to supply nominal AC or DC voltages to the controller 400 or other components of the system 100. The source of AC power 110 is, for example, mains power having nominal line voltages between 100V and 240V AC and frequencies of approximately 50-60 Hz. The source of DC power is, for example, a photovoltaic array or a battery bank (e.g., an array of battery cells having a lithium-based chemistry) capable of providing high DC voltages to the power input module (e.g., voltages between 12V DC and 1000V DC). The power input module 405 is configured to convert received AC power to DC power and/or step down received DC power to a lower voltage. In addition to powering the controller 400, the power input module 405 is configured to provide power to the power output module 410. In the embodiment illustrated in FIG. 4, the transmitter 105 is capable of communicating with the receiver 125 through the communications interface 415 or using power line communication between the power output module 410 and the receiver 125. With reference to FIG. 2, the controller 400 can generally correspond to the source controller 215 and the power output module 410 can correspond to the switch 220. The controller 400 is configured to generate digital electricity using energy transmission and sample periods as described above with respect to FIG. 2.

Figure 5:
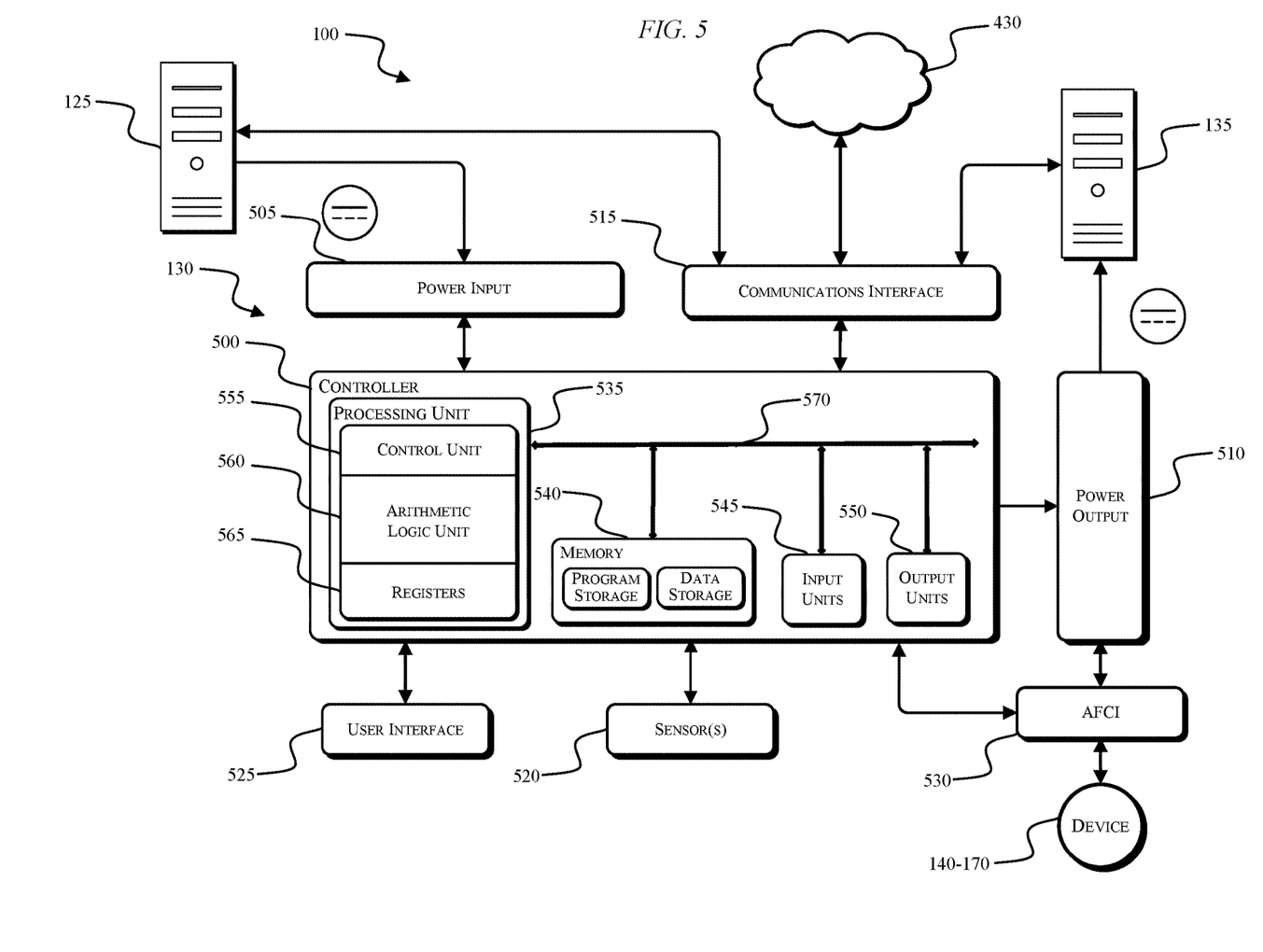
FIG. 5 illustrates a power distribution controller, according to embodiments described herein.

FIG. 5 illustrates the first power distribution controller 130 of FIG. 1 in more detail. The first power distribution controller 130 is electrically and/or communicatively connected to a variety of modules or components of the system 100. For example, the first power distribution controller 130 is connected to the receiver 125, the second power distribution controller 135, and one or more of the devices 140-170. The first power distribution controller 130 includes a controller 500, a power input module 505, a power output module 510, a communications interface 515, one or more sensors 520, and a user interface 525. The first power distribution controller 130 also includes an arc fault circuit interrupter ("AFCI") 530 (e.g., switch 220, 225) for disabling power to the device 140-170 when an arc fault condition is detected.

The controller 500 includes combinations of hardware and software that are operable to, for example, receive and transform DC electricity, monitor for transmission fault conditions, etc. The controller 500 includes a plurality of electrical and electronic components that provide power and operational control to the components and modules within the controller 500 and/or the system 100. For example, the controller 500 includes, among other things, a processing unit 535 (e.g., a microprocessor, a microcontroller, or another suitable programmable device), a memory 540, input units 545, and output units 550. The processing unit 535 includes, among other things, a control unit 555, an ALU 560, and a plurality of registers 565 (shown is a group of registers in FIG. 5) and is implemented using a known architecture. The processing unit 535, the memory 540, the input units 545, and the output units 550, as well as the various modules connected to the controller 500 are connected by one or more control and/or data buses (e.g., common bus 570). The control and/or data buses are shown schematically in FIG. 5 for illustrative purposes.

The memory 540 is a non-transitory computer readable medium and includes, for example, a program storage area and a data storage area. The program storage area and the data storage area can include combinations of different types of memory, such as ROM, RAM (e.g., DRAM, SDRAM, etc.), EEPROM, flash memory, a hard disk, an SD card, or other suitable magnetic, optical, physical, electronic memory devices, or other data structures. The processing unit 535 is connected to the memory 540 and executes software instructions that are capable of being stored in a RAM of the memory 540 (e.g., during execution), a ROM of the memory 540 (e.g., on a generally permanent basis), or another non-transitory computer readable data storage medium such as another memory or a disc. Software included in the implementation of the system 100 or controller 500 can be stored in the memory 540 of the controller 500. The software includes, for example, firmware, one or more applications, program data, filters, rules, one or more program modules, and other executable instructions. The controller 500 is configured to retrieve from memory and execute, among other things, instructions related to the control methods and processes describe herein. In some embodiments, the controller 500 includes a plurality of processing units 535 and/or a plurality of memories 540 for retrieving from memory and executing the instructions related to the control methods and processes describe herein.

In some embodiments, the controller 500 or network communications interface 515 includes one or more communications ports (e.g., Ethernet, SATA, USB, IDE, etc.) for transferring, receiving, or storing data associated with the first power distribution controller 130 or the operation of the first power distribution controller 130. In some embodiments, the communications interface 515 enables communication with the external network 430 for control and or monitoring related to the system 100.

The sensors 520 can include voltage sensors, current sensors, temperature sensors, etc. Output signals from the sensors 520 can be used by the controller 500 to determine various fault conditions of the first power distribution controller 130 or the system 100. In some embodiments, the fault conditions include cross-line fault conditions, in-line fault conditions, ground fault conditions, arc fault conditions, neutral fault conditions, etc.

The user interface 525 can include a combination of digital and analog input or output devices required to achieve a desired level of control and monitoring for the first power distribution controller 130. For example, the user interface 525 can include a display, one or more LEDs, and/or input devices such as a mouse, touch-screen display, a plurality of knobs, dials, switches, buttons, etc.

The power input module 505 is configured to receive input power from the receiver 125. The power input module 505 is configured to supply nominal DC voltages to the controller 500 or other components of the system 100. The power input module 505 is configured, for example, step down received DC power to a lower voltage. In addition to powering the controller 500, the power input module 505 is configured to provide power to the power output module 510. In the embodiment illustrated in FIG. 5, the first power distribution controller 130 is capable of communicating with the second power distribution controller 135 through the communications interface 515 or using power line communication between the power output module 510 and the second power distribution controller 135. The power output module 510 is also configured to provide output power to one or more of the devices 140-170. As described above with respect to FIG. 3, the connection between the first power distribution controller 130 and the devices 140-170 can be configured as a POE implementation that enables the transmission of both power and data between the first power distribution controller 130 and the devices 140-170.

The controller 500 is configured to provide arc fault protection to the system 100. The controller 500 provides arc fault protection by detecting or determining the presence of an arc fault condition between the first power distribution controller 130 and one or more of the devices 140-170. When the controller 500 detects or determines the presence of an arc fault condition, the controller 500 is configured to control the AFCI 530 to disable power to the affected device(s) 140-170. In some embodiments, either the controller 500 or the device 140-170 can disable power distribution (e.g., by opening switch 220, 225) in the event of an arc fault condition.

The controller 500 is configured to detect an arc fault condition using a variety of techniques. In some embodiments, the controller 500 uses arc fault detection techniques individually. In other embodiments, the controller 500 implements a variety of arc fault detection techniques collectively. For example, the controller 500 can determine whether an arc fault condition is present based on the data portion of an energy packet and measuring an amount of error present in one or a series of energy packets (e.g., aggregate errors from unreceived data). Specifically, the controller 500 is configured to transmit a digital electricity energy packet (i.e., including an energy payload and a data payload) to a device 140-170. The controller 500 is configured to determine or measure an amount of error associated with the digital electricity energy packet (e.g., associated with the data payload). In some embodiments, the controller 500 is configured to receive a determination or measurement of the amount of error associated with the digital electricity energy pack (e.g., from a device 140-170). The controller 500 is then configured to evaluate the amount of individual or accumulated errors for a given data packet or a series of data packets (e.g., data packets received over a predetermined period of time). Errors specific to a data packet include, for example, a loss of data in the data packet (e.g., evaluated based on frame loss rate), an amount of attenuation of the data packet (e.g., a magnitude of the reduction in the amplitude of the transmitted data), an amount of distortion associated with the data signal (e.g., signal-to-noise ratio), etc.

When the controller 500 determines that an individual error or aggregate of errors associated with a data packet or series of data packets is greater than or equal to an error threshold value (e.g., a frame loss rate threshold value, an attenuation threshold value, a signal-to-noise ratio threshold value, etc.), the controller 500 determines that an arc fault condition is present. In some embodiments, the controller 500 is configured to determine whether other fault conditions associated with the system 100 are present, such as an improper connection, a loose connection, excessive cable length, external noise, etc. (e.g., based on the amount of error present). When the controller 500 determines that an arc fault condition or other fault condition is present, the controller 500 is configured to disable power to, for example, one or more of the devices 140-170. In some embodiments, when the controller 500 determines that an arc fault condition or other fault condition is present, the controller 500 is configured to disable a power connection to the receiver 125 or the second power distribution controller 135. In some embodiments, the controller 500 is configured to transmit a data packet and evaluate the transmitted data packet to take a protective action based on the transmitted data packet. For example, the controller 500 can evaluate the transmitted data packet to self-identify or self-diagnose arcing or an error in a wiring system, a fault in a data packet transmission system, a fault in an energy conversion or control system, etc.

Additionally or alternatively, the controller 500 uses a predetermined data packet or diagnostic signal between the first power distribution controller 130 and the devices 140-170 to detect an arc fault condition. For example, similar to the error-based fault detection described above, the controller 500 is configured to evaluate accumulated errors for the predetermined data or diagnostic signal(s). Errors specific to such a signal include, for example, a loss of data in the data packet (e.g., evaluated based on frame loss rate), an amount of attenuation of the data packet (e.g., a magnitude of the reduction in the amplitude of the signal), an amount of distortion associated with the signal (e.g., signal-to-noise ratio, etc.), etc. When an individual error or aggregate of errors (e.g., based on percentage correlation of the received data packet and the predetermined data packet) associated with signal is greater than or equal to an error threshold value (e.g., a frame loss rate threshold value, an attenuation threshold value, a signal-to-noise ratio threshold value, an error percentage, etc.), the controller 500 determines that an arc fault or other fault condition is present. In some embodiments, evaluating a diagnostic signal provides more precise fault detection because the diagnostic signal being evaluated is a predetermined packet having a reference value known by the controller 500.

In some embodiments, arc fault detection is focused on individual devices (e.g., network address-based arc fault detection). For example, the controller 500 can vary one or more thresholds for detecting arc fault conditions. Devices that are more likely to produce an arc fault condition can be monitored more closely. In some embodiments, devices that use more than a threshold level of power (e.g., more than 250 W) are monitored for arc fault conditions, and devices that use the threshold level or less of power are not monitored for arc fault conditions.

In some embodiments, and with reference to FIG. 2, the controller 500 can generally correspond to the source controller 215 and the power output module 510 can correspond to the switch 220. In such embodiments, the controller 500 is configured to generate digital electricity using energy transmission and sample periods as described above with respect to FIG. 2. In some embodiments, the second power distribution controller 135 is configured to operate in the same or similar manner as the first power distribution controller 130.

The arc fault protection techniques describe above with respect to the first power distribution controller 130 apply equally to the operation of the second power distribution controller 135. In some embodiments, the arc fault protection techniques described above are applied at other locations within the system 100, such as between the power sources 110, 115 and the transmitter 105, between the transmitter 105 and the receiver 125, and between the receiver 125 and the first power distribution controller 130.

Thus, embodiments described herein provide, among other things, arc fault protection in a digital electricity power distribution system. Various features and advantages are set forth in the following claims.

What is claimed is:

1. A power distribution system for providing power to a device, the system comprising:

an arc fault circuit interrupter ("AFCI"); and
a controller connected to the AFCI, the controller operable to control the AFCI to disable power to the device, the controller including a processor and a memory, the controller configured to:
transmit a digital electricity energy packet through the AFCI to the device,
measure an amount of error associated with the digital electricity energy packet,
evaluate the amount of error associated with the digital electricity energy packet,
determine whether an arc fault condition is present based on an evaluation of the amount of error associated with the digital electricity energy packet, and
control the AFCI to disable power to the device when the arc fault condition is determined to be present.

2. The power distribution system of claim 1, wherein the digital electricity energy packet includes an energy payload and a data payload.

3. The power distribution system of claim 2, wherein the amount of error is associated with one selected from the group consisting of: a loss of data in the data payload; an amount of attenuation of the data payload; and an amount of distortion associated with the data payload.

4. The power distribution system of claim 1, wherein the power provided to the device is between 400 W and 600 W.

5. The power distribution system of claim 1, wherein the controller is further configured to determine whether one of a cross-line fault condition, an in-line fault condition, a ground fault condition, or a neutral fault condition is present.

6. The power distribution system of claim 1, wherein the amount of error associated with the digital electricity energy packet is an aggregate of errors from unreceived data in a series of energy packets.

7. The power distribution system of claim 1, wherein the amount of error associated with the digital electricity energy packet is an aggregate of errors from unreceived data over a predetermined period of time.

8. The power distribution system of claim 1, wherein the controller is further configured to determine whether the arc fault condition is present based on a comparison of the amount of error to at least one of a frame loss rate threshold value, an attenuation threshold value, a signal-to-noise ratio threshold value.

9. The power distribution system of claim 1, wherein the arc fault condition is caused by at least one of an improper connection, a loose connection, excessive cable length, or external noise.

10. The power distribution system of claim 1, wherein the controller is further configured to determine whether the arc fault condition is present based on the evaluation of the amount of error based on a comparison to a predetermined data packet.

11. The power distribution system of claim 10, wherein the controller is further configured to determine whether the arc fault condition is present based on a percentage correlation of the digital electricity energy packet and the predetermined data packet.

12. A power distribution system for providing power to a device, the system comprising:
a power transmitter configured to receive at least one of an alternative current ("AC") input power and a direct current ("DC") input power and generate digital electricity energy packets for distribution through the system;
a power receiver electrically connected to the power transmitter for receiving the digital electricity energy packets;
an arc fault circuit interrupter ("AFCI") connected between the power transmitter and the power receiver; and
a controller connected to the AFCI, the controller operable to control the AFCI to disable power from the power transmitter to the power receiver, the controller including a processor and a memory, the controller configured to:
transmit a digital electricity energy packet through the AFCI to the power receiver,
measure an amount of error associated with the digital electricity energy packet,
evaluate the amount of error associated with the digital electricity energy packet,
determine whether an arc fault condition is present based on an evaluation of the amount of error associated with the digital electricity energy packet, and
control the AFCI to disable power to the power receiver when the arc fault condition is determined to be present.

13. The power distribution system of claim 12, wherein the digital electricity energy packet includes an energy payload and a data payload.

14. The power distribution system of claim 13, wherein the amount of error is associated with one selected from the group consisting of: a loss of data in the data payload; an amount of attenuation of the data payload; and an amount of distortion associated with the data payload.

15. A method for disabling power to a device in a digital electricity system, the digital electricity system including an arc fault circuit interrupter ("AFCI"), the method comprising:
transmitting a digital electricity energy packet through the AFCI to the device;
measuring an amount of error associated with the digital electricity energy packet;
evaluating the amount of error associated with the digital electricity energy packet;
determining whether an arc fault condition is present based on an evaluation of the amount of error associated with the digital electricity energy packet; and
controlling the AFCI to disable power to the device when the arc fault condition is determined to be present.

16. The method of claim 15, wherein the digital electricity energy packet includes an energy payload and a data payload.

17. The method of claim 16, wherein the amount of error is associated with a loss of data in the data payload.

18. The method of claim 16, wherein the amount of error is associated with an amount of attenuation of the data payload.

19. The method of claim 16, wherein the amount of error is associated with an amount of distortion associated with the data payload.

20. The method of claim 15, wherein the power provided to the device is between 400 W and 600 W.

* * * * *